United States Patent
Sanders et al.

(10) Patent No.: US 9,415,520 B2
(45) Date of Patent: Aug. 16, 2016

(54) SWIVEL LINK FOR MOUNTING END OF ARM TOOLING

(71) Applicant: Swivel-Link, LLC, Hicksville, OH (US)

(72) Inventors: Roger W. Sanders, Antwerp, OH (US); Anthony R. Nighswander, Hicksville, OH (US)

(73) Assignee: Swivel-Link, LLC, Hicksville, OH (US)

( * ) Notice: Subject to any disclaimer, the term of this patent is extended or adjusted under 35 U.S.C. 154(b) by 67 days.

(21) Appl. No.: 14/456,246

(22) Filed: Aug. 11, 2014

(65) Prior Publication Data

US 2016/0039098 A1  Feb. 11, 2016

(51) Int. Cl.
*B25J 17/00* (2006.01)
*B25J 17/02* (2006.01)
*B25J 18/00* (2006.01)
*B25J 15/06* (2006.01)

(52) U.S. Cl.
CPC .......... *B25J 17/0275* (2013.01); *B25J 15/0616* (2013.01)

(58) Field of Classification Search
CPC .... B25J 15/06; B25J 15/0616; B25J 15/0666; B25J 17/02; B25J 17/0225; B25J 17/0208; B25J 19/0025; B25J 19/0029; B25J 19/0033; B25J 19/0091
USPC .......................................................... 403/56
See application file for complete search history.

(56) References Cited

U.S. PATENT DOCUMENTS

| | | | | | |
|---|---|---|---|---|---|
| 3,124,971 | A * | 3/1964 | Peters et al. | ............... | F16B 7/00 403/56 |
| 3,223,442 | A * | 12/1965 | Fawdry | ................. | B65G 47/91 294/189 |
| 3,638,973 | A * | 2/1972 | Poletti | .................... | A61B 17/02 137/583 |
| 3,648,853 | A * | 3/1972 | Winne | ..................... | B23Q 7/04 294/64.2 |
| 4,225,258 | A * | 9/1980 | Thompson | .............. | F16C 11/06 403/141 |
| 4,557,623 | A * | 12/1985 | Tella | ....................... | B25J 9/146 403/31 |
| 4,704,043 | A * | 11/1987 | Hackman | ............ | F16C 11/0619 403/143 |
| 4,863,133 | A * | 9/1989 | Bonnell | ................. | A61B 19/26 16/319 |
| 5,149,146 | A * | 9/1992 | Simoni | ................. | B05B 15/067 285/146.1 |
| 5,172,922 | A * | 12/1992 | Kowaleski | ........... | B25J 15/0616 279/3 |
| 5,846,015 | A * | 12/1998 | Mononen | ................ | F16C 1/101 118/119 |
| 7,281,739 | B2 * | 10/2007 | Kniss | ..................... | B25J 13/086 294/65 |
| 7,918,440 | B2 * | 4/2011 | Schiavi | ................. | B25B 11/005 269/20 |
| 8,267,449 | B2 * | 9/2012 | Maffeis | .................. | B65G 47/91 294/183 |
| 8,534,951 | B2 * | 9/2013 | Komine | ................ | F16C 11/106 248/288.51 |
| 2002/0094227 | A1 * | 7/2002 | Filipiak | .................. | F16C 11/06 403/56 |
| 2013/0147101 | A1 * | 6/2013 | Cho | ..................... | B25J 15/0616 269/21 |

* cited by examiner

*Primary Examiner* — David M Fenstermacher
*Assistant Examiner* — Jake Cook
(74) *Attorney, Agent, or Firm* — Taylor IP, P.C.

(57) ABSTRACT

A robotic end of arm tooling system including a robotic arm having an end, and at least one swivel link assembly attached to the robotic arm. The swivel link assembly includes a flexible ball base connected to the end of the robotic arm, and a knuckle joint defining at least one adjustable axis. The flexible ball base is able to swivel relative to the adjustable axis. An adapter has a proximal end and a distal end, with the proximal end connected to the flexible ball base, and an end-effector connected to the distal end.

7 Claims, 3 Drawing Sheets ing parts throughout the several views. The exemplification set out herein illustrates one embodiment of the invention and such exemplification is not to be construed as limiting the scope of the invention in any manner.

SWIVEL LINK FOR MOUNTING END OF ARM TOOLING

BACKGROUND OF THE INVENTION

1. Field of the Invention

The present invention relates to robotic applications and more particularly to techniques for mounting end of arm tooling to a robot arm.

2. Description of the Related Art

End of arm tooling (EOAT) in robotic applications is well known in various industries. EOAT can be broadly referred to as the end-effector situated near the end of a robot arm. End-effectors and robotic arms can be used to manipulate numerous complex items in manufacturing, production or shipping. End-effectors can be used to grasp onto an item to transport the item, stabilize the item, orient the item or perform various other desired tasks. These item handling robots are best suited for highly repetitive tasks and/or where precise placement is required.

End-effectors generally include grabbers or grippers. A grabber commonly has two or more opposing grip pickup arms which close together to grasp an item. Grippers may also have two or more opposing grip pickup arms, or they may only have a single grip arm able to grip a load. Certain types of grippers may include, but are not limited to suction cup grippers, pneumatic grippers, hydraulic grippers, electro-servo grippers and magnetic grippers. End-effectors are typically connected directly to the end of the robot arm, but may also be connected anywhere along a member of the robot to better grab or grip an item.

Vacuum cup systems have an end-effector that uses suction cups for gripping a surface of the target item. The grip strength is relative to the size of the suction cup, the vacuum force of the suction cup and the number of suction cups employed. EOAT suction cups are adaptable and germane to grip onto nearly any target item. The target items may include sheet metal panels, cardboard boxes or plastics of complex shapes. Though the suction cups themselves are quite versatile, the apparatus used to mount the suction cups to the end of a robot arm are generally stiff and machined specifically and uniquely for that particular robotic system and/or target item.

It may be impractical to design an end-effector specifically for one type of item, thereby making the end-effector useful in only one mode of application. In order to conform to a different target item, the entire EOAT system may need to be altered. Reconfiguring the EOAT may be time consuming and costly.

What is needed in the art is an adjustable connection between an EOAT and a robotic arm.

SUMMARY OF THE INVENTION

The present invention provides a flexible swivel link assembly to adjustably connect end of arm tooling (EOAT) to a robotic arm. The invention further provides a damping mechanism that counteracts translational forces acting on an end-effector.

In one form the invention is directed to a robotic end of arm tooling system including a robotic arm having an end, and at least one swivel link assembly attached to the robotic arm. The swivel link assembly includes a flexible ball base connected to the end of the robotic arm, and a knuckle joint defining at least one adjustable axis. The flexible ball base is able to swivel relative to the adjustable axis. An adapter has a proximal end and a distal end, with the proximal end connected to the flexible ball base, and an end-effector connected to the distal end.

An advantage of the present invention is that the orientation and placement of end-effectors can be easily adjusted to grip onto multiple distinct target items.

Another advantage of the present invention is that translational forces acting on an end-effector are damped as a result of the swivel link assembly interconnecting the end-effector and the robotic arm.

Yet another advantage of the present invention is that the swivel link assembly houses and protects tubing, hosing and/or electrical wiring from being damaged.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
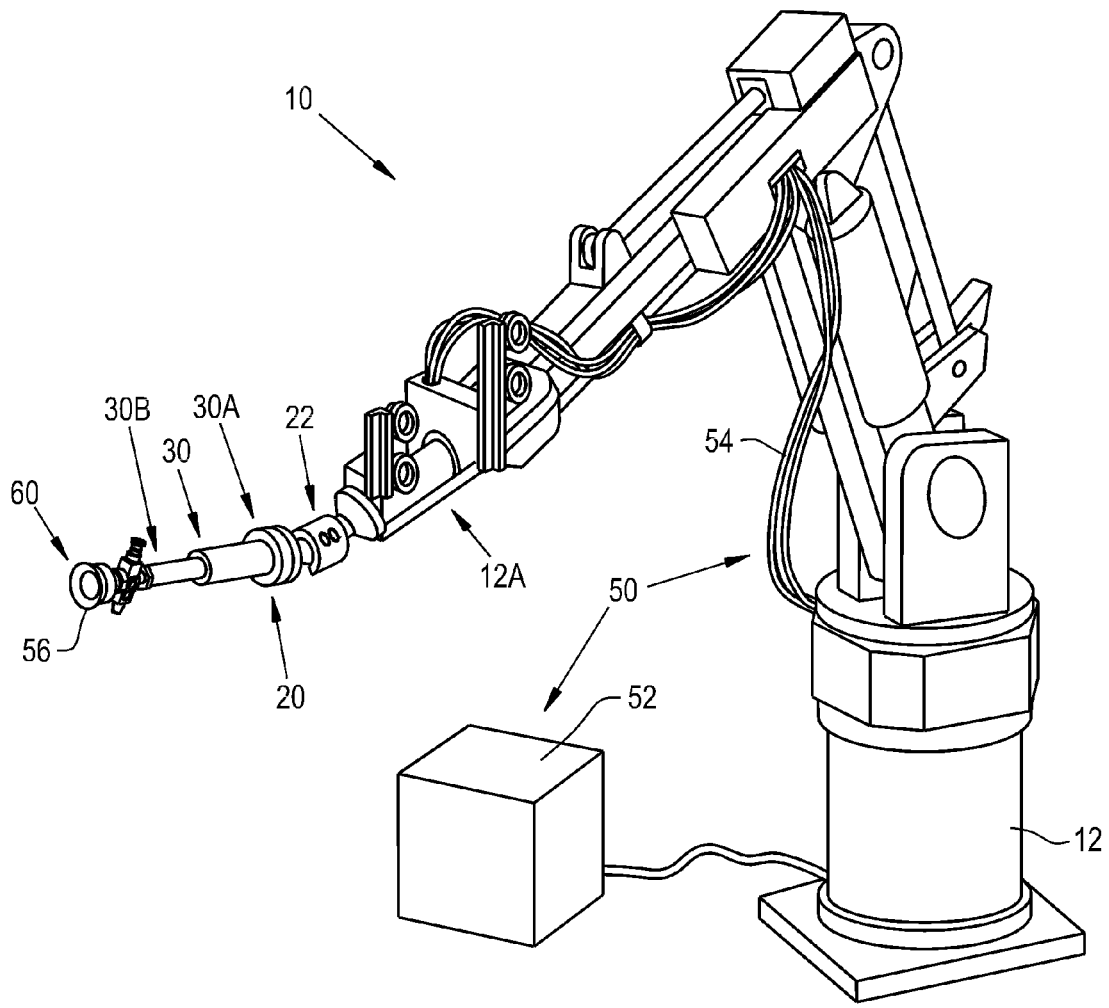
FIG. 1 is a perspective view of an embodiment of the robotic end of arm tooling system.

Referring now to the drawings, and more particularly to FIG. 1, there is shown an embodiment of robotic EOAT system 10 including a robotic arm 12, a swivel link assembly 20, and an EOAT in the form of a vacuum cup system 50. The robotic arm 12 has an end 12A configured for attaching an end-effector 60 which enables the robotic arm 12 to grip onto a target part. In the present invention the end-effector 60 is a suction gripper 56, yet the end-effector 60 may include any grabber or gripper known in the art.

Figure 2:
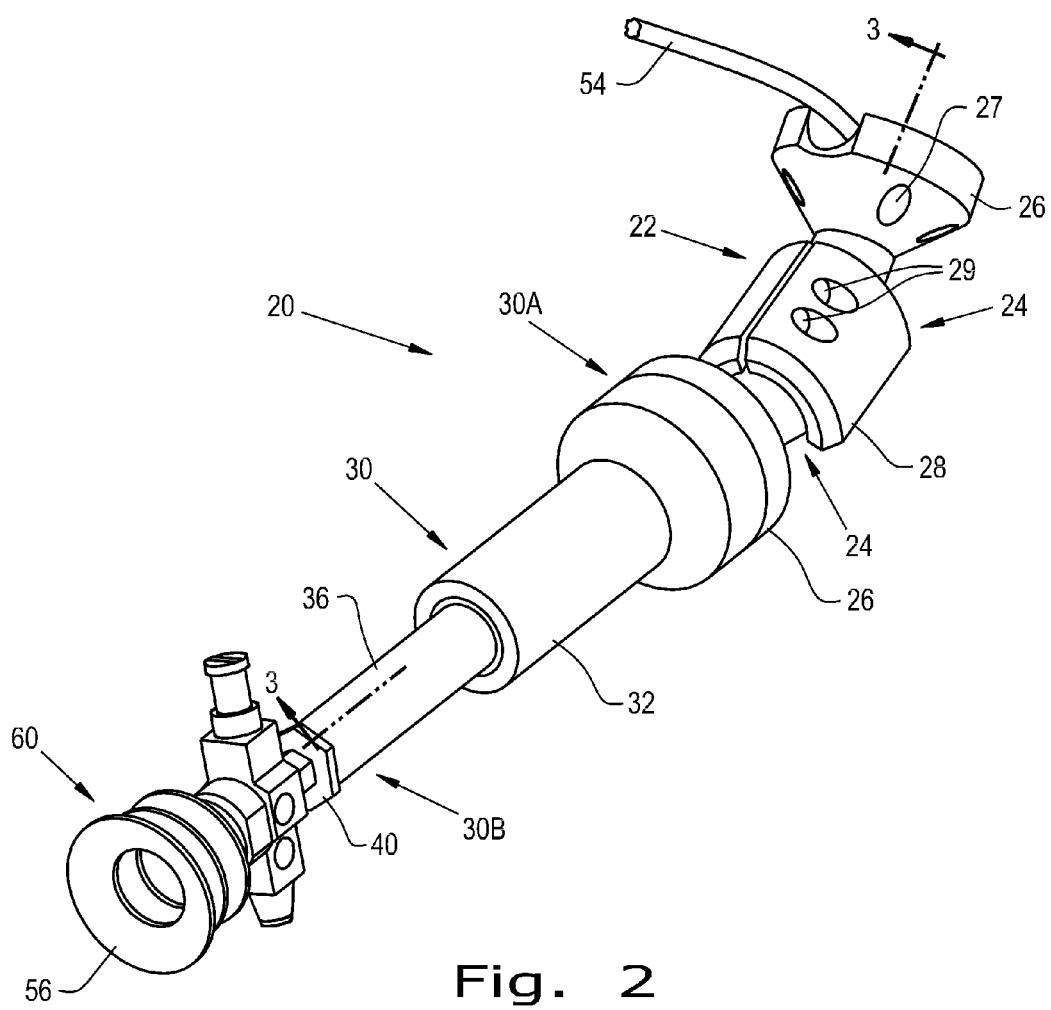
FIG. 2 is a perspective view of the swivel link assembly with an end-effector and suction tube, shown in FIG. 1.
Figure 3:
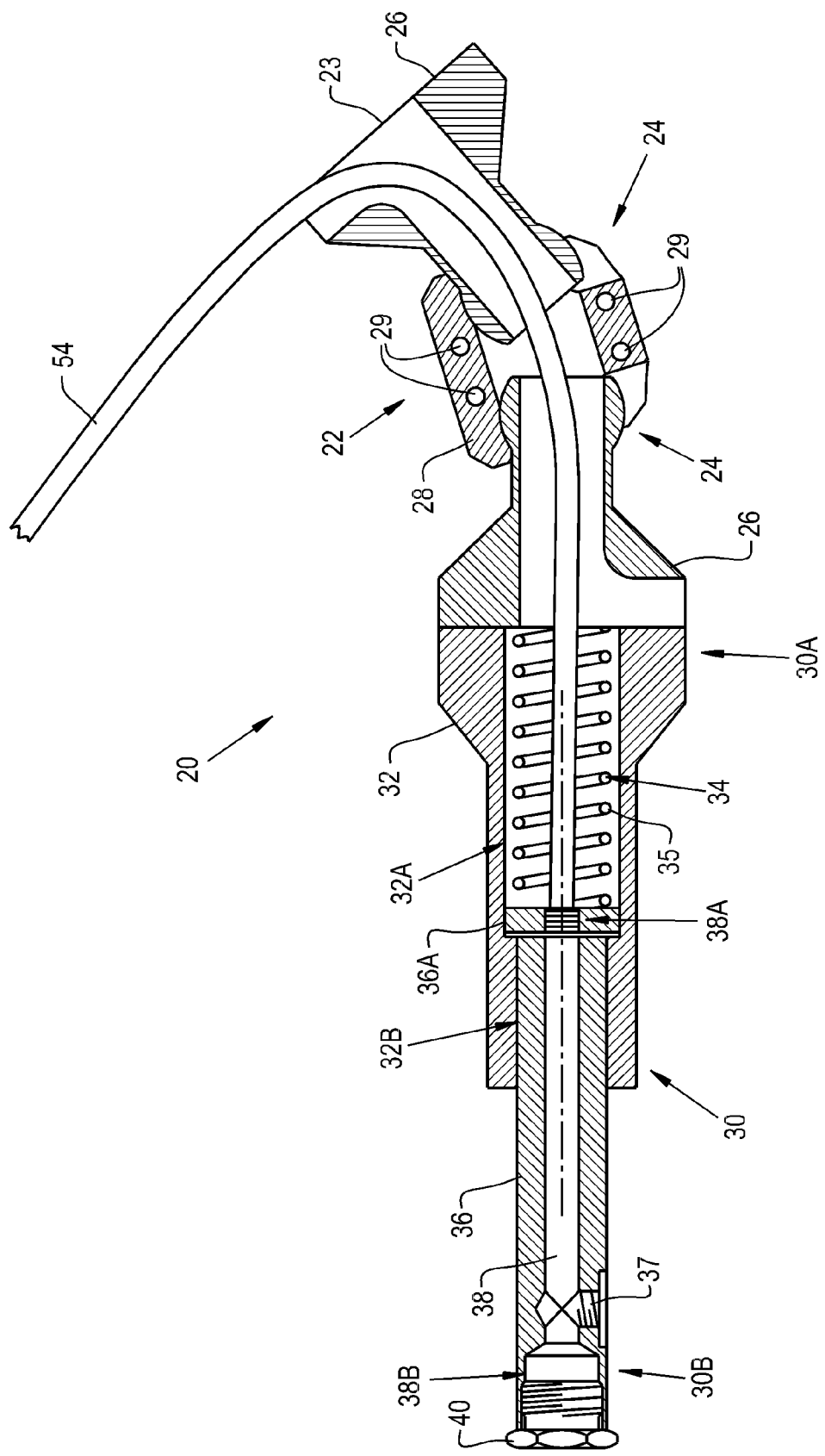
FIG. 3 is cross-sectional view of the swivel link assembly shown in FIGS. 1 and 2, taken along line 3-3 in FIG. 2.

Referring now to FIGS. 2 and 3, the swivel link assembly 20 includes a flexible ball base 22 and an adapter 30. The flexible ball base 22 includes two ball bases 26 interconnected by a knuckle joint 28. However, variations of the number of ball bases 26 interconnected by knuckle joints 28 are within the scope of the present invention. The ball bases 26 and the knuckle joint 28 have a hollow central opening 23 designed to be a protective housing (FIG. 3). The ball bases 26 have holes 27 or the like through which fasteners (not shown) may be inserted to attach a respective ball base 26 to the robotic arm 12 and the adapter 30.

The knuckle joint 28 forms a cylindrical sleeve which partially covers the substantially spherical portions of the ball bases 26. The knuckle joint 28 has holes 29 or the like through which fasteners (not shown) may be inserted to tighten or loosen the connection between the knuckle joint 28 and the ball bases 26. The knuckle joint 28 defines at least one adjustable axis of rotation 24, and enables a considerable degree of freedom to the flexible ball base 22 (FIG. 3).

The adapter 30 includes a spring sleeve 32, a compression spring 34 and a spring pin 36. The adapter 30 has a proximal end 30A that connects to the flexible ball base 22 and a distal end 30B that connects to the end-effector 60. The spring sleeve 32 includes the proximal end 30A, and has a bore of two different diameters which houses the compression spring 34 and partially houses the spring pin 36 (FIG. 3). The larger bore diameter defines a first housing 32A that is in communication with the hollow central opening of the flexible ball base 22. The compression spring 34 is encased in the housing 32A and locked in place between the flexible ball base 22 and the spring pin 36. The smaller bore diameter defines a second housing 32B that partially encases the spring pin 36 and keeps the spring pin 36 aligned in a substantially horizontal plane relative to the spring sleeve 32. A bearing may be used within the smaller bore diameter 32B to reduce the effects of friction acting on the spring pin 36 (not shown).

The compression spring 34, positioned within the spring sleeve 32, is adjacent to both the flexible ball base 22 and the spring pin 36. The compression spring 34 is actuated by the spring pin 36 as it travels in an axial direction. The spring force damps the net effect of the forces acting on the end-effector 60 and/or the robotic arm 12. The present invention shows the compression spring 34 as an aluminum coil spring 35; however, the compression spring 34 may include a coil spring, gas spring or disc spring made of any advantageous material. It may also include a plurality of springs acting as a single damper or acting as multiple distinct dampers.

The spring pin 36 has a first end 36A for contacting the compression spring 34 inside the spring sleeve 32, and it extends outwardly from the spring sleeve 32 to the distal end 30B connecting the end-effector 60. The first end 36A has a wider contacting surface positioned inside the first housing 32A which keeps the spring pin 36 in contact with the compression spring 34 and from slipping out of spring sleeve 32. The spring pin 36 also has a chamber 38 designed for accommodating a vacuum associated with the vacuum cup system 50. The chamber 38 may also be used to house wiring or tubing. Depending on an auspicious use within the scope of the present invention (e.g., magnetics), the spring pin 36 may be configured without a chamber 38 entirely.

The spring pin 36 further includes a decentralized vacuum adapter 40 threaded into the spring pin 36 for connecting the suction gripper 56 (FIG. 3). Alternatively, the spring pin 36 may also connect directly, without the use of the decentralized vacuum adapter 40, to other EOAT devices which do not include the vacuum cup system 50. As to provide multiple connecting options the spring pin 36 also includes a side port 37 to connect tubing or wiring to an end-effector 60.

The vacuum cup system 50 includes a vacuum pump 52, a suction tube 54 and a suction gripper 56 (FIG. 1). The vacuum pump 52 provides the suction force to the suction gripper 56 via the suction tube 54. The vacuum pump 52 is operated by well-known pumps in the art (e.g., mechanical pumps using a rotary system or venturi vacuum pumps). The suction tube 54 is made of plastic or any advantageous material. The vacuum cup system 50 may include a single active suction tube 54 carrying a suction force or a plurality of active suction tubes 54 carrying a plurality of suction forces to respective suction grippers 56.

The suction tube 54 runs inside the flexible ball base 22 and the spring sleeve 32. The suction tube 54 is not pinched or kinked throughout the highly adjustable degree of freedom due to the knuckle and sleeve design of the swivel link assembly 20. The suction tube 54 passes internally through the hollow opening 23 in the flexible ball base 22, through the center of the compression spring 34, and fluidly connects to the first end 38A of the chamber 38 inside the spring sleeve 32. The suction force is retained by the chamber 38, and can be applied directly to the suction gripper 56 using the decentralized vacuum adapter 40 attached to the second end 38B of the chamber 38. The suction force may also be routed through the side port 37 to the suction gripper 56 using a small line of suction tube 54.

Within the scope of the present invention the swivel link assembly 20 may also encase and protect various other types of tubing or hoses and/or electrical wiring that run from the robotic arm 12 to the end-effector 60.

The swivel link assembly 20 serves multiple purposes of providing quick and efficient adjustments to end-effectors 60, damping translational forces affecting the suction gripper 56, protecting suction tubes 54, and carrying a suction force to the suction gripper 56. Instead of designing an end-effector 60 for a unique target part, the swivel link assembly 20 provides a customizable solution for gripping concave or convex shaped parts. By adjusting the axis of rotation 24, and by adding various combinations of ball bases 26, knuckle joints 28, and adapters 30 the possibilities of gripping onto a complex part are nearly endless. By routing the suction tube 54 inside the swivel link assembly 20 it protects the suction tube 54 from damage and improves durability and longevity while maintaining an uncluttered and clean robotic EOAT system 10. By damping forces acting on the end-effector 60 and/or the forces resulting from the movement of the robotic arm 12, the target part and the robotic EOAT system 10 are safeguarded from abrupt movements that would otherwise cause damage. The swivel link assembly 20 is designed to provide years of quality use while being easily adjusted and interchanged to match nearly any robotic application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A robotic end of arm tooling system, comprising:
a robotic arm having an end;
at least one swivel link assembly attached to said robotic arm, including:
a flexible ball base connected to said end of said robotic arm, and including a knuckle joint defining at least one adjustable axis, said flexible ball base being able to swivel relative to said adjustable axis; and
an adapter including:
a proximal end and a distal end, said proximal end connected to said flexible ball base; and
a spring sleeve having said proximal end, said spring sleeve having a bore which houses a compression spring and partially houses a spring pin, the spring pin being adjacent to said compression spring and extending outwardly from the spring sleeve to said distal end; and
an end-effector connected to said distal end;
wherein said spring pin is moveable in an axial direction relative to said spring sleeve by actuating said compression spring, thereby using a spring force for damping translational forces acting on said end-effector.
2. The robotic end of arm tooling system of claim 1, wherein said compression spring includes at least one of a coil spring, a gas spring and a disc spring.

3. The robotic end of arm tooling system of claim 1, wherein said flexible ball base has a hollow central opening which is in communication with said bore.

4. The robotic end of arm tooling system of claim 3, wherein said end-effector includes a vacuum cup system for applying a suction to a target part, said vacuum cup system including a suction tube, and a suction gripper for applying said suction to said target part via said suction tube.

5. The robotic end of arm tooling system of claim 4, wherein said spring pin has a chamber with a first end positioned inside said spring sleeve and a second end, said suction tube passes through the hollow central opening in said flexible ball base and through said compression spring inside said spring sleeve, said suction tube fluidly connected to the first end of said chamber for creating a vacuum inside said chamber in communication with said suction gripper connected to the second end of said chamber.

6. The robotic end of arm tooling system of claim 1, wherein said end-effector includes at least one of a grabber, a servo-electric gripper, a pneumatic gripper, a hydraulic gripper, and a vacuum gripper.

7. A robotic end of arm tooling system, comprising:
   a robotic arm having an end;
   at least one swivel link assembly attached to said robotic arm, including:
      a flexible ball base connected to said end of said robotic arm, and including a knuckle joint defining at least one adjustable axis, said flexible ball base being able to swivel relative to said adjustable axis; and
      an adapter including:
         a proximal end and a distal end, said proximal end connected to said flexible ball base; and
         a spring sleeve having said proximal end, said spring sleeve having a bore which houses a compression spring and partially houses a spring pin, the spring pin being adjacent to said compression spring and extending outwardly from the spring sleeve to said distal end; and
   an end-effector connected to said distal end;
   wherein said flexible ball base has a hollow central opening which is in communication with said bore;
   wherein said end-effector includes a vacuum cup system for applying a suction to a target part, said vacuum cup system including a suction tube, and a suction gripper for applying said suction to said target part via said suction tube; and
   wherein said spring pin has a chamber with a first end positioned inside said spring sleeve and a second end, said suction tube passes through the hollow central opening in said flexible ball base and through said compression spring inside said spring sleeve, said suction tube fluidly connected to the first end of said chamber for creating a vacuum inside said chamber in communication with said suction gripper connected to the second end of said chamber.

* * * * *